(12) United States Patent
Kim (10) Patent No.: US 9,126,621 B1
(45) Date of Patent: Sep. 8, 2015

(54) LEVER FOR DRIVE-BY-WIRE SYSTEM

(71) Applicant: Hyundai Motor Company, Seoul (KR)

(72) Inventor: Eun-Sik Kim, Gwangmyeong-Shi (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/563,576

(22) Filed: Dec. 8, 2014

(30) Foreign Application Priority Data

Aug. 29, 2014 (KR) .......................... 10-2014-113864

(51) Int. Cl.
 *B62D 1/12* (2006.01)
 *B60K 26/02* (2006.01)
 *B60K 23/00* (2006.01)

(52) U.S. Cl.
 CPC . *B62D 1/12* (2013.01); *B60K 23/00* (2013.01); *B60K 2026/029* (2013.01)

(58) Field of Classification Search
 CPC .......... B62D 1/12; B60K 26/02; B60K 23/00; F16H 59/0217
 USPC ....................................... 180/333; 74/471 R
 See application file for complete search history.

(56) References Cited

U.S. PATENT DOCUMENTS

| | | | | |
|---|---|---|---|---|
| 4,476,954 A | * | 10/1984 | Johnson et al. | 180/333 |
| 5,086,870 A | * | 2/1992 | Bolduc | 180/333 |
| 5,833,578 A | * | 11/1998 | Potis | 477/165 |
| 5,845,735 A | * | 12/1998 | Muller et al. | 180/322 |
| 6,006,852 A | * | 12/1999 | Eckstein et al. | 180/333 |
| 6,152,676 A | * | 11/2000 | Evert et al. | 414/631 |
| 6,263,997 B1 | * | 7/2001 | Breuning et al. | 180/402 |
| 8,255,093 B2 | * | 8/2012 | Layton et al. | 701/2 |
| 2004/0254048 A1 | * | 12/2004 | Yone | 477/108 |
| 2005/0039969 A1 | * | 2/2005 | Laukkanen | 180/333 |
| 2008/0023250 A1 | * | 1/2008 | Hefner et al. | 180/332 |
| 2010/0313693 A1 | * | 12/2010 | Crombez | 74/484 R |

FOREIGN PATENT DOCUMENTS

| | | |
|---|---|---|
| JP | 2014-52885 A | 3/2014 |
| KR | 10-2004-0016632 | 2/2004 |
| KR | 10-2008-0055380 | 6/2008 |

* cited by examiner

*Primary Examiner* — Ruth Ilan
(74) *Attorney, Agent, or Firm* — Morgan, Lewis & Bockius LLP (57) ABSTRACT

A lever for a drive-by-wire system installed in a vehicle, may include a lever body that is rotatably mounted on a console surface of the vehicle, and an acceleration lever and a steering roller that are installed in the lever body, such that it is possible to control a change of a gear shift stage, acceleration, and a change of a proceeding direction of the vehicle in a unified manner, and there is no risk of erroneous manipulations of an accelerator pedal and a brake pedal, and acceleration and a proceeding direction may be changed using a finger, thereby improving performance in manipulating the vehicle.

8 Claims, 8 Drawing Sheets

LEVER FOR DRIVE-BY-WIRE SYSTEM

CROSS-REFERENCE TO RELATED APPLICATIONS

The present application claims priority to Korean Patent Application No. 10-2014-113864, filed on Aug. 29, 2014, the entire contents of which is incorporated herein for all purposes by this reference.

BACKGROUND OF THE INVENTION

1. Field of the Invention

The present invention relates to a lever for a drive-by-wire system installed in a vehicle, and more particularly, to a lever for a drive-by-wire system, in which a lever body is rotatably mounted on a console surface of the vehicle, and an acceleration lever and a steering roller are installed in the lever body, such that it is possible to control a change of a gear shift stage, acceleration, and a change of a proceeding direction of the vehicle in a unified manner.

2. Description of Related Art

In general, a drive-by-wire system, so-called an X-by-wire system, which is applied to a vehicle, refers to a system in which an electrical connection structure which uses an actuator, an electronic control unit (ECU), and the like, is substituted for a mechanical connection structure that is positioned between a control mechanism (for example, a gear shift lever) in the vehicle and an apparatus (for example, a transmission), which is actually operated.

The drive-by-wire system is widely classified into a throttle-by-wire system, a brake-by-wire system, a shift-by-wire system, a steer-by-wire system, and the like.

The throttle-by-wire system controls flows of air and fuel, which flow into cylinders, in accordance with a position of an accelerator pedal in an electrical manner, the brake-by-wire system brakes the vehicle in accordance with an electrical signal from a brake pedal, the shift-by-wire system performs a gear shift operation of the vehicle in accordance with an electrical signal from the gear shift lever, and the steer-by-wire system changes a direction of the vehicle in accordance with an electrical signal from a steering wheel.

The drive-by-wire system has advantages in that the drive-by-wire system is very excellent in terms of vibration and noise characteristics in comparison with a mechanical system, is hardly affected by a spatial restriction unlike the mechanical system, and may provide improved driving performance because a steering device, a brake device, a suspension device, and the like are operated together.

However, the drive-by-wire system of the vehicle in the related art has problems of the vehicle in the related art as they are, because the mechanical connection structure is just substituted by the electronic connection structure, but there is no manipulation mechanism capable of maximizing the advantages of the drive-by-wire system.

That is, there are problems in that a driver is injured by the steering wheel at the time of a vehicle collision accident, there is a risk of an accident due to erroneous manipulation when the driver manipulates the accelerator pedal and the brake pedal with the right foot, and there is a problem in that the driver repeatedly manipulates the pedals when the vehicle travels on a highway or over a long distance which causes an ankle injury.

There is a problem in that because the gear shift lever protrudes from the console surface even at normal times, an accommodation space, buttons for performing functions necessary to drive the vehicle, and the like cannot be freely disposed at the periphery of the gear shift lever.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a lever for a drive-by-wire system, which may control a change of a gear shift stage, acceleration, and a change of a proceeding direction of a vehicle in a unified manner, by integrating functions of an acceleration pedal and a steering wheel into a lever of the vehicle.

The present invention has also been made in an effort to provide a lever for a drive-by-wire system, in which there is no risk of erroneously manipulating an accelerator pedal and a brake pedal, and acceleration and proceeding directions may be changed by a finger, thereby improving performance in manipulating a vehicle.

Technical problems to be achieved in an aspect of the present invention are not limited to the aforementioned technical problems, and any other not-mentioned technical problems will be obviously understood from the description below by those skilled in the technical filed to which the present invention pertains.

An aspect of the present invention provides a lever for a drive-by-wire system, including a lever body which is rotatably coupled to a console surface of a vehicle by a console side connecting portion formed at a lower side of the console surface and by a central axis rod, a rotary motor which rotates a lever body by rotating a motor gear that is fastened to engage with a central axis gear formed at one end of the central axis rod, a gear shift control unit which recognizes a change in position of a gear shift magnet embedded in the motor gear, and changes a gear shift stage of the vehicle, an acceleration lever which may have a rear end rotatably coupled in the lever body, and protrudes through a first opening hole formed in one side surface of the lever body, an acceleration control unit which recognizes a change in position of an acceleration magnet embedded in the acceleration lever, and accelerates the vehicle, a steering roller which is mounted in the lever body so as to be exposed through a second opening hole formed in the other side surface of the lever body, a steering control unit which recognizes the change in position of a steering magnet attached to an end of the steering roller, and changes a proceeding direction of the vehicle, and an elastic unit which is installed between the acceleration lever and the steering roller, and provides elastic restoring force to the acceleration lever and the steering roller, in which a change of a gear shift stage, acceleration, and a change of a proceeding direction of the vehicle are controlled in a unified manner.

According to the lever for a drive-by-wire system according to the exemplary embodiment of the present invention, the elastic unit may be formed as a flat spring having both depressed surfaces, which may have a lower surface that is curved upward so that the acceleration lever is seated on the lower surface, and an upper surface that is curved downward so that the steering roller is seated on the upper surface, and a shape of the elastic unit may be deformed by an operation of the acceleration lever, such that a steering effort of the steering roller is varied.

The lever for a drive-by-wire system according to the exemplary embodiment of the present invention may further include a central axis groove portion which is coupled to the other end of the central axis rod, and may have a plurality of curved teeth that curvedly protrudes, and a bullet unit which is disposed below the central axis groove portion, may have a return spring and a solenoid coil embedded therein, pushes a bullet rod upward, in which the curved teeth of the central axis groove portion are caught by the bullet rod of the bullet unit, such that shift feeling is generated when the lever body is rotated.

According to the lever for a drive-by-wire system according to the exemplary embodiment of the present invention, when a lever button disposed in the vehicle is operated, the lever body may pop up in a stepwise manner by the central axis groove portion and the bullet unit as the rotary motor is rotated, when a stop button disposed in the vehicle is operated, the lever body may be temporarily fixed as the rotation of the rotary motor is stopped, and when the stop button is operated, the gear shift control unit may recognize a position of the gear shift magnet embedded in the motor gear as a P-stage.

According to the lever for a drive-by-wire system according to the exemplary embodiment of the present invention, in a state in which the stop button is operated, when the lever body is rotated rearward by a length corresponding to one curved tooth of the central axis groove portion, the gear shift control unit may recognize the changed position of the gear shift magnet as an R-stage, when the lever body is rotated rearward by a length corresponding to two curved teeth of the central axis groove portion, the gear shift control unit may recognize the changed position of the gear shift magnet as an N-stage, and when the lever body is rotated rearward by a length corresponding to three curved teeth of the central axis groove portion, the gear shift control unit may recognize the changed position of the gear shift magnet as a D-stage.

According to the lever for a drive-by-wire system according to the exemplary embodiment of the present invention, in a state in which the stop button is operated, when the lever body is rotated forward, the rotary motor may be operated to return the lever body to an initial position (P-stage state) when the stop button is operated.

According to the lever for a drive-by-wire system according to the exemplary embodiment of the present invention, when the lever body is rotated rearward by a length corresponding to four or more curved teeth of the central axis groove portion, the rotary motor may be operated to return the lever body to the position (D-stage state) at which the lever body is moved rearward by a length corresponding to three curved teeth of the central axis groove portion.

The lever for a drive-by-wire system according to the exemplary embodiment of the present invention may further include a rectilinear motor which is disposed at a rear side of the acceleration lever, and may have a rectilinear rod that is movable forward and rearward, in which the rectilinear rod presses and supports a rear end of the acceleration lever when the rectilinear rod is moved forward, and prevents the acceleration lever from being rotated.

The present invention having the aforementioned configuration may include the lever body which is rotatably mounted on the console surface of the vehicle, and the acceleration lever and the steering roller which are installed in the lever body, so as to control a change of a gear shift stage, acceleration, and a change of a proceeding direction of the vehicle in a unified manner, thereby simplifying the structure in the vehicle, and reducing production costs of the vehicle.

By simplifying the structure in the vehicle, a safety device such as a large capacity airbag and a protective plate may be actively applied, and by eliminating the steering wheel and the accelerator panel in the vehicle, injuries to the driver may be prevented at the time of a collision accident.

According to the present invention, the accelerator pedal is substituted by the acceleration lever, thereby preventing an accident due to erroneous manipulations of the accelerator panel and the brake pedal, and removing inconvenience when the driver repeatedly manipulates the accelerator panel when the vehicle travels on a highway or over a long distance.

According to the present invention, the acceleration lever may be manipulated using four fingers, and the steering roller may be manipulated using a sensitive thumb, such that precise and comfortable manipulations are available, and operating characteristics of the vehicle may be remarkably increased.

According to the present invention, an expensive motor driven power steering (MDPS) motor, which was used in the related art to increase or decrease a steering effort of the steering wheel in proportion to a traveling state of the vehicle, may be substituted by the elastic unit formed as a simple flat spring having both depressed surfaces, thereby reducing costs of the vehicle.

According to the present invention, the central axis groove portion is coupled to the other end of the central axis rod, and the bullet unit is disposed below the central axis groove portion, such that shift feeling is generated at the lever body, thereby allowing the driver to clearly recognize the change in the gear shift stage when the driver manipulates the lever body to change the gear shift stage of the vehicle.

According to the present invention, the lever body returns to the P-stage state or the D-stage state by the rotary motor when the driver rotates the lever body forward, or rotates the lever body excessively rearward, thereby preventing the lever body from deviating due to manipulation mistakes of the driver.

According to the present invention, the rectilinear rod is moved forward to press and support the acceleration lever under a condition in which acceleration of the vehicle is dangerous, thereby preventing an accident of the vehicle, and preventing an erroneous manipulation of the acceleration lever.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in detail with reference to the accompanying drawings so that those skilled in the technical field to which the present invention pertains may easily carry out the present invention. However, the present invention may be implemented in various different forms, and is not limited to the exemplary embodiments described herein.

A part irrelevant to the description will be omitted to clearly describe the present invention, and the same or similar constituent elements will be designated by the same reference numerals throughout the specification.

Terms or words used in the specification and the claims should not be interpreted as a general and dictionary meaning and should be interpreted as a meaning and a concept which conform to the technical spirit of the present invention based on a principle that an inventor can appropriately define a concept of a term in order to describe his/her own invention by the best method.

Figure 1:
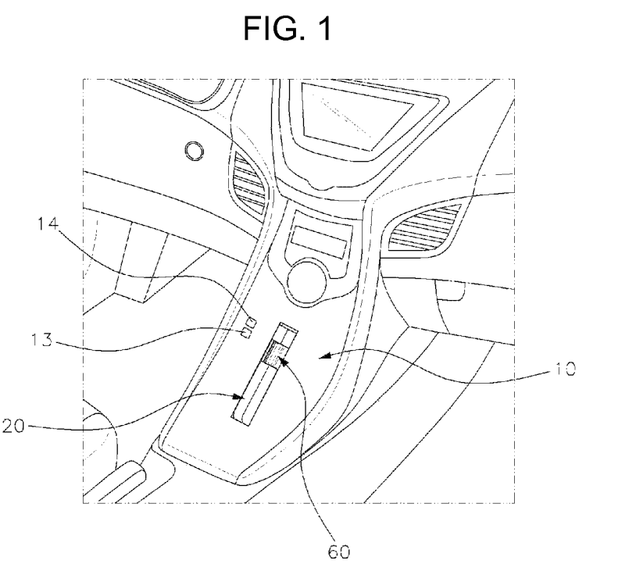
FIG. 1 is a schematic view illustrating an appearance in which a lever for a drive-by-wire system according to an exemplary embodiment of the present invention is installed in a vehicle.
Figure 2:
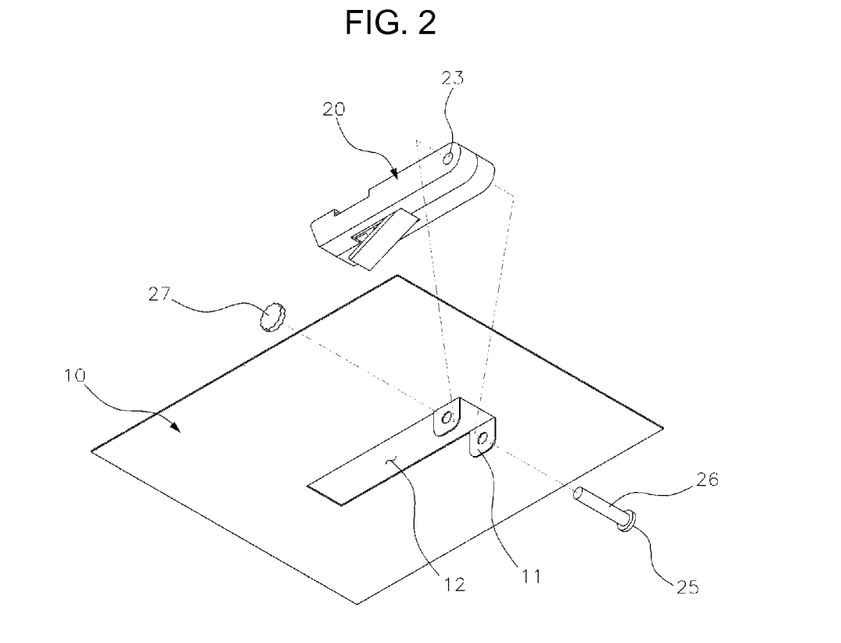
FIG. 2 is a bottom perspective view illustrating a connection structure between a lever body according to the exemplary embodiment of the present invention and a console surface.
Figure 3:
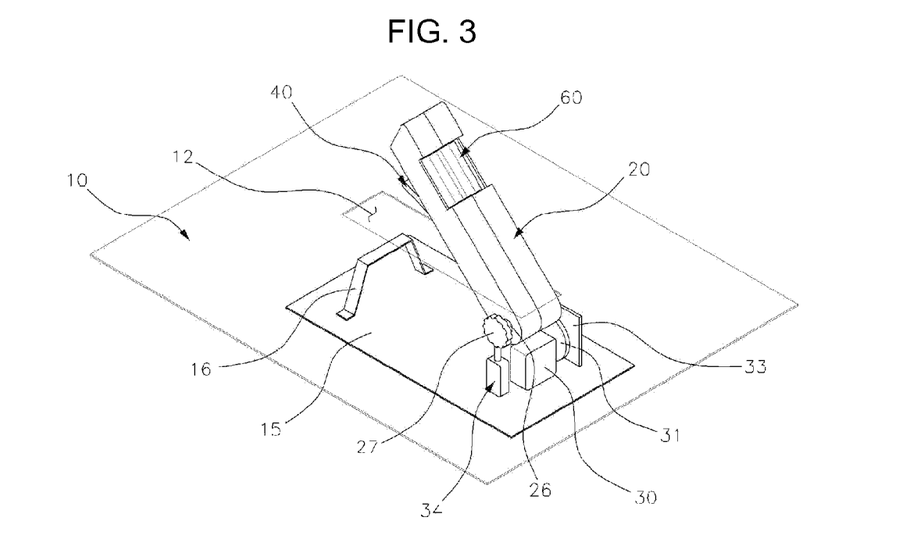
FIG. 3 is a projection perspective view illustrating an overall appearance of the lever for a drive-by-wire system according to the exemplary embodiment of the present invention.
Figure 4:
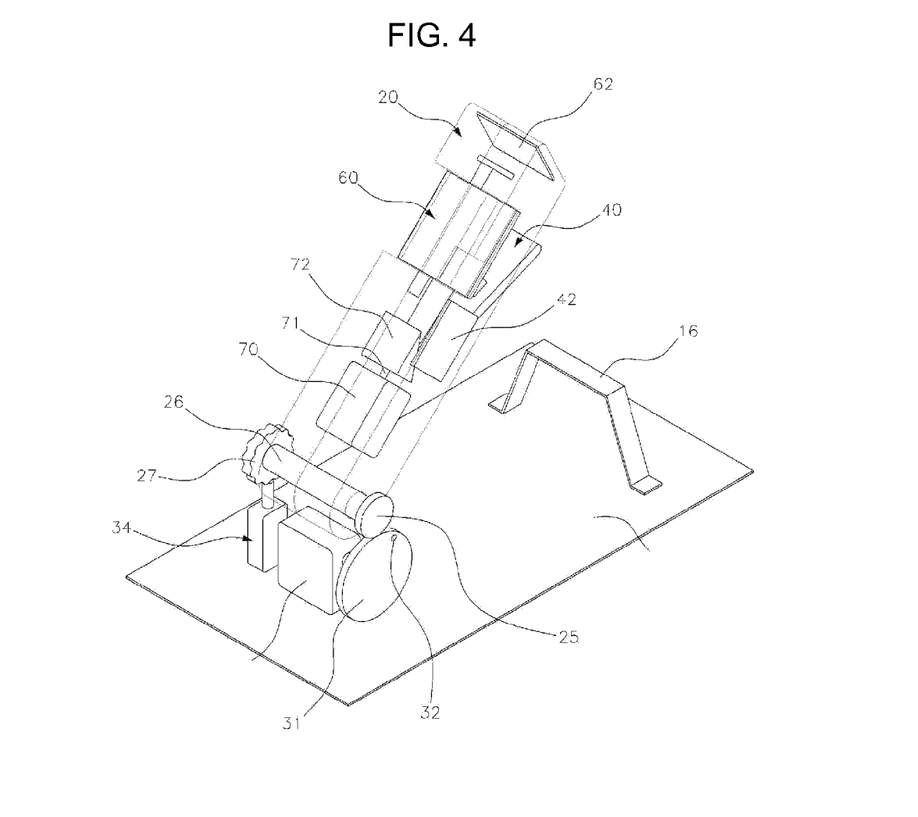
FIG. 4 is a projection perspective view illustrating the lever body and components in the lever body according to the exemplary embodiment of the present invention.
Figure 5:
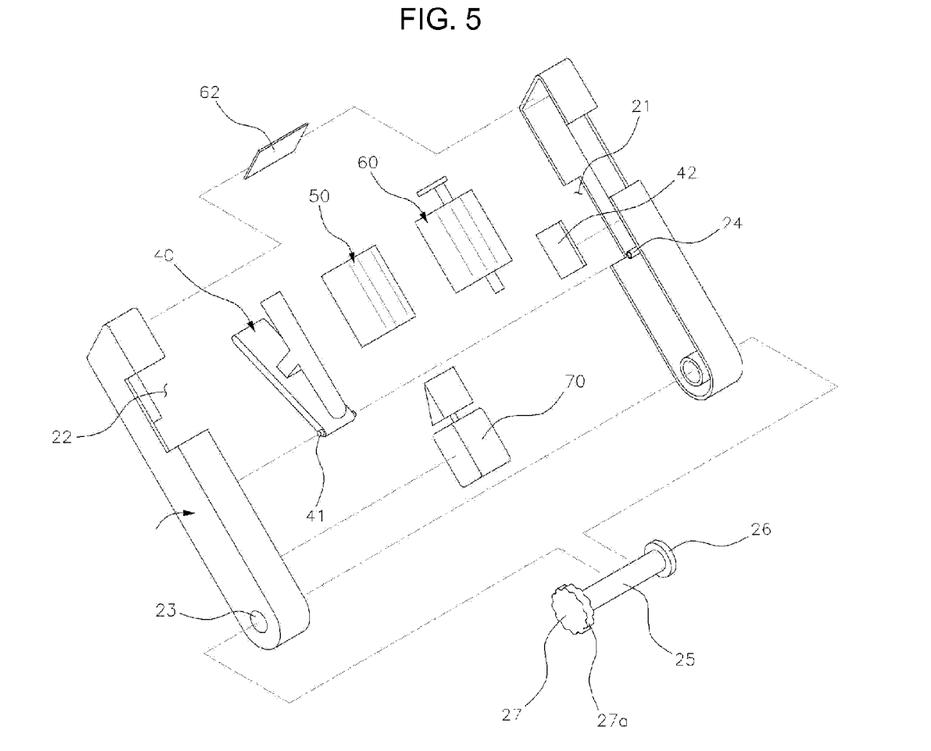
FIG. 5 is an exploded view illustrating the components in the lever body according to the exemplary embodiment of the present invention.

FIG. 1 is a schematic view illustrating an appearance in which a lever for a drive-by-wire system according to an exemplary embodiment of the present invention is installed in a vehicle, FIG. 2 is a bottom perspective view illustrating a connection structure between a lever body and a console surface according to the exemplary embodiment of the present invention, FIG. 3 is a projection perspective view illustrating an overall appearance of the lever for a drive-by-wire system according to the exemplary embodiment of the present invention, FIG. 4 is a projection perspective view illustrating the lever body and components in the lever body according to the exemplary embodiment of the present invention, and FIG. 5 is an exploded view illustrating the components in the lever body according to the exemplary embodiment of the present invention.

The lever for a drive-by-wire system according to the exemplary embodiment of the present invention includes the lever body 20, a rotary motor 30, a gear shift control unit 33, an acceleration lever 40, an acceleration control unit 42, an elastic unit 50, a steering roller 60, and a steering control unit 62, and may control a change of a gear shift stage, acceleration, and a change of a proceeding direction of the vehicle in a unified manner.

As illustrated in FIG. 1, the lever body 20 according to an exemplary embodiment of the present invention may be installed on the console surface 10 in the vehicle, but may also be installed at various positions such as at the left side of a driver seat, or a position in the related art where a steering wheel is disposed, in consideration of the type of vehicle, a driver's preference, and the like.

Specifically, as illustrated in FIG. 2, the lever body 20 is rotatably coupled to the console surface 10 by a pair of console side connecting portions 11, which is formed at a lower side of the console surface 10, and a central axis rod 26, and a through hole 23 is formed at a rear end of the lever body 20 so that the central axis rod 26 may pass through the through hole 23.

The central axis rod 26 may be formed in an angled shape, and connected with the through hole 23 of the lever body 20, which is formed to have a shape corresponding to the shape of the central axis rod 26, or the central axis rod 26 may be integrally connected with the lever body 20 by ultrasonic welding.

That is, the central axis rod 26 and the lever body 20 are coupled to each other so as to transmit rotational motion to each other, such that when the lever body 20 is rotated, the central axis rod 26 is also rotated, and on the contrary, when the central axis rod 26 is rotated, the lever body 20 is also rotated.

As illustrated in FIGS. 2 and 3, a central axis gear 25 is coupled to one end of the central axis rod 26 which is connected with the lever body 20, and the central axis gear 25 is fastened so as to engage with a motor gear 31 installed below the central axis gear 25.

A support plate 15 is installed below the console surface 10, and the motor gear 31 is rotated in accordance with rotation of a rotary motor 30 coupled to the support plate 15, thereby rotating the central axis gear 25 and the central axis rod 26.

When the central axis gear 25 and the central axis rod 26 are rotated, the lever body 20, which is coupled to the central axis rod 26, is rotated, and pops up toward an upper side of the console surface 10 through an aperture 12 of the console surface 10, and thereafter, is stopped at a position at which the driver may conveniently manipulate the lever body 20.

The manipulation of the lever body 20 may be performed by a lever button 13 and a stop button 14 disposed on the console surface 10 as illustrated in the exemplary embodiment, but the lever button 13 and the stop button 14 may be disposed anywhere in the vehicle (for example, on a center fascia or at a front side of a driver seat), and the manipulation of the lever body 20 may be automatically performed in some cases by recognizing whether or not the driver is seated on the driver seat, and the like.

In the exemplary embodiment of the present invention, the lever button 13 serves to allow the lever body 20 to pop up by rotating the rotary motor 30, and the stop button 14 serves to stop the lever body 20 at a position desired by the driver.

A support frame 16 is additionally coupled to the support plate 15 disposed below the console surface 10, and serves to prevent the lever body 20 from being excessively moved downward when the lever body 20 is moved downward through the aperture 12.

The lever body 20 may be rotated in accordance with the rotation of the rotary motor 30 as described above, or may be rotated as the driver holds the lever body 20 with a hand and moves the lever body 20 forward and rearward.

A gear shift magnet (32 in FIG. 7) is embedded in the motor gear 31 so as to indicate whether the motor gear 31 is rotated and a rotation amount of the motor gear 31, and a gear shift control unit 33, which is disposed to be adjacent to the motor gear 31, recognizes a change in position of the gear shift magnet 32, and changes the gear shift stage of the vehicle.

Figure 7:
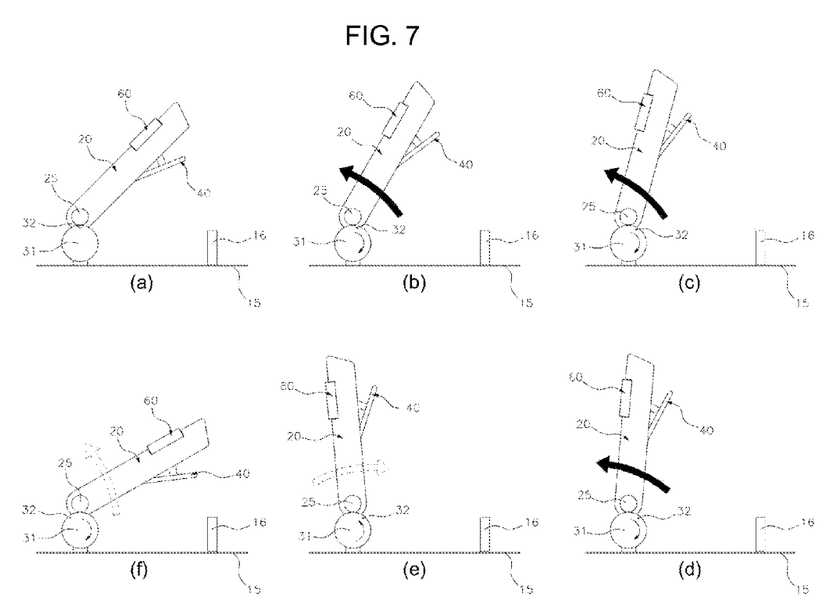
FIG. 7 is a side view illustrating rotation of a motor gear, and a position of a gear shift magnet in accordance with rotation of the lever body according to the exemplary embodiment of the present invention.

That is, when the driver operates the lever button 13, the lever body 20 pops up, and then is stopped by the operation of the stop button 14, and in this case, the gear shift control unit 33 first recognizes the position of the gear shift magnet 32 in the motor gear 31. Thereafter, when the driver holds the lever body 20 and rotates the lever body 20 forward and rearward, the position of the gear shift magnet 32 is varied as the motor gear 31 is rotated, and the gear shift control unit 33 recognizes the change in position of the gear shift magnet 32 and changes the gear shift stage of the vehicle.

As illustrated in FIGS. 4 and 5, the acceleration lever 40, the elastic unit 50, the steering roller 60, and the like are mounted in the lever body 20.

The acceleration lever 40 is rotatably coupled to the lever body 20 as acceleration projections 41 formed at a rear end of the acceleration lever 40 are inserted into projection grooves 24 formed in an inner surface of the lever body 20, and the acceleration lever 40 may protrude through a first opening hole 21 formed in one side surface (a lower surface in the illustrated exemplary embodiment) of the lever body 20.

The elastic unit 50 is disposed on an upper portion of the acceleration lever 40 and provides elastic restoring force to the acceleration lever 40, and the propensity of the acceleration lever 40 to consistently protrude through the first opening hole 21 is maintained by the elastic unit 50.

An acceleration magnet is embedded in the acceleration lever 40 so as to indicate whether the acceleration lever 40 is rotated and a rotation amount of the acceleration lever 40, and an acceleration control unit 42, which is disposed to be adjacent to the acceleration lever 40, recognizes a change in position of the acceleration magnet and accelerates the vehicle.

That is, like an operation of the driver pressing an accelerator pedal in the related art, when the driver holds the acceleration lever 40 with four fingers and then presses the acceleration lever 40, the acceleration lever 40 is rotated about the acceleration projections 41, and in this case, the acceleration control unit 42 recognizes a change in position of the acceleration magnet and accelerates the vehicle.

A second opening hole 22 is formed in the other side surface (an upper surface in the illustrated exemplary embodiment) of the lever body 20, and the steering roller 60 is mounted in the lever body 20 so as to be exposed through the second opening hole 22.

The elastic unit 50 is disposed on a lower portion of the steering roller 60 and provides elastic restoring force to the steering roller 60, and the propensity of the steering roller 60 to be positioned at a center instead of being rotated leftward and rightward is maintained by the elastic unit 50.

The elastic unit 50 also serves to provide a steering effort (force required to change a direction of the vehicle) to the steering roller 60.

A pair of steering magnets 61 is attached to a front end of the steering roller 60, and the steering magnets 61 serve to indicate whether the steering roller 60 is rotated and a rotation amount of the steering roller 60.

Like an operation of the driver rotating a steering wheel in the related art, when the driver positions the thumb on the steering roller 60 and rotates the steering roller 60 leftward and rightward, the positions of the steering magnets 61 attached to the steering roller 60 are varied, and in this case, the steering control unit 62, which is disposed to be adjacent to the steering roller 60, recognizes the change in position of the steering roller 60 and changes a proceeding direction of the vehicle.

Therefore, the driver may change the gear shift stage of the vehicle, accelerate the vehicle, and change the proceeding direction of the vehicle, just by holding the lever body 20 with one hand and rotating the lever body 20 forward and rearward, by pressing the acceleration lever 40 with four fingers, or by rotating the steering roller 60 leftward and rightward using the thumb.

Figure 6:
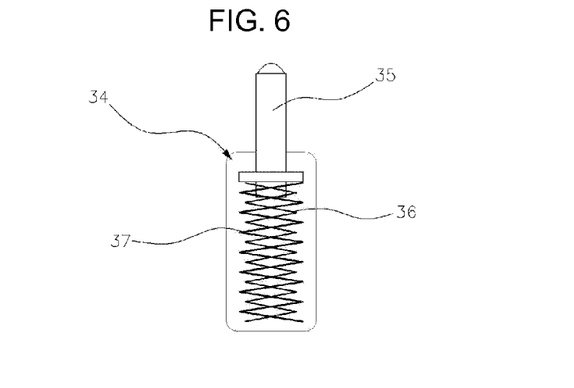
FIG. 6 is a projection side view illustrating a bullet unit and components in the bullet unit according to the exemplary embodiment of the present invention.
Figure 8:
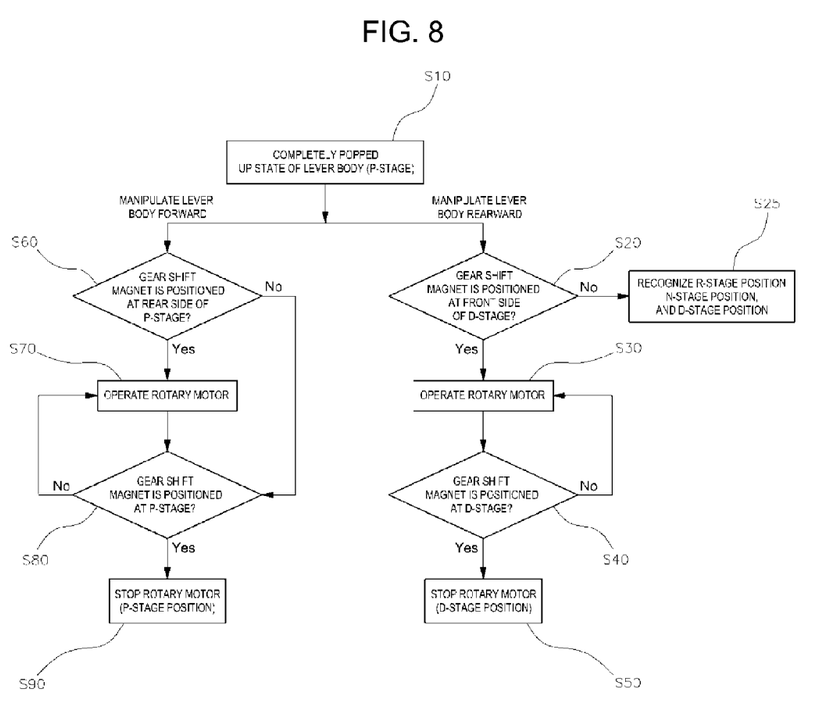
FIG. 8 is a flow chart illustrating logic for controlling an operation of a rotary motor caused by rotation of the lever body according to the exemplary embodiment of the present invention.

FIG. 6 is a projection side view illustrating a bullet unit and components in the bullet unit according to the exemplary embodiment of the present invention, FIG. 7 is a side view illustrating rotation of a motor gear, and a position of a gear shift magnet in accordance with rotation of the lever body according to the exemplary embodiment of the present invention, and FIG. 8 is a flow chart illustrating logic for controlling an operation of a rotary motor caused by rotation of the lever body according to the exemplary embodiment of the present invention.

As illustrated in FIGS. 4 and 6, a central axis groove portion 27 on which a plurality of curved teeth 27a is formed is coupled to the other end (that is, a side opposite to a portion to which the central axis gear 25 is coupled) of the central axis rod 26, and the bullet unit 34 is disposed below the central axis groove portion 27 and generates shift feeling when the lever body 20 is rotated.

Specifically, a return spring 36 is mounted in the bullet unit 34 and pushes a bullet rod 35 upward, and the bullet rod 35 climbs over the curved teeth 27a of the central axis groove portion 27, such that shift feeling is generated at the lever body 20.

That is, when the driver operates the lever button 13 to rotate the rotary motor 30, the central axis gear 25, which engages with the motor gear 31, is rotated to move the lever body 20 upward. In this case, the curved teeth 27a of the central axis groove portion 27 are caught by the bullet rod 35 of the bullet unit 34, such that the lever body 20 is moved upward in a stepwise manner with "click-rotation-click-rotation-click".

Even when the driver holds the lever body 20 and intends to change the gear shift stage of the vehicle, the driver may surely recognize the change of the gear shift stage by the central axis groove portion 27 and the bullet unit 34.

A solenoid coil 37 is mounted in the bullet unit 34, and the solenoid coil 37 generates a magnetic field when electric power is applied to the solenoid coil 37, and pushes the bullet rod 35 upward with strong force so as to allow the lever body 20 to be almost fixed.

The solenoid coil 37 serves to prevent the lever body 20 from being rotated by excessive force by the driver when the acceleration lever 40 is manipulated, or when the steering roller 60 is manipulated, to thereby prevent the change of the gear shift stage which is not desired by the driver. The solenoid coil 37 is manipulated by a separate button disposed in the vehicle, or automatically manipulated by the manipulation of the acceleration lever 40 or the steering roller 60.

As illustrated in FIGS. 7A and 8, the lever body 20 pops up as the rotary motor 30 is rotated by the operation of the lever button 13, and is temporarily fixed as the rotary motor 30 is stopped by the operation of the stop button 14, and in this case, the position of the gear shift magnet 32 embedded in the motor gear 31 is recognized as a P-stage by the gear shift control unit 33 (P-stage state, S10).

As illustrated in FIGS. 7B and 8, in a state in which the stop button 14 is operated, when the driver holds the lever body 20 and rotates the lever body 20 rearward (counterclockwise in the illustrated exemplary embodiment) by a length corresponding to one curved tooth 27a of the central axis groove portion 27 (that is, to such an extent that shift feeling is felt one time), the motor gear 31 is rotated forward (clockwise in the illustrated exemplary embodiment), such that the position of the gear shift magnet 32 is changed (S20), and in this case, the gear shift control unit 33 recognizes the changed position of the gear shift magnet 32 as an R-stage (R-stage state, S25).

As illustrated in FIGS. 7C, 7D, and 8, when the driver rotates the lever body 20 rearward by a length corresponding to two or three curved teeth 27a in a similar manner, the gear shift magnet 32 embedded in the motor gear 31 is rotated forward (S20), and the gear shift stage of the vehicle is changed to an N-stage (N-stage state) or to a D-stage (D-stage state) (S25).

As illustrated in FIGS. 7E and 8, when the driver rotates the lever body 20 by a length corresponding to four or more curved teeth 27a, the gear shift control unit 33 recognizes that the gear shift magnet 32 deviates from the D-stage state, such that the rotary motor 30 is operated (S30). Based on the operation of the rotary motor 30, the motor gear 31 is rotated counterclockwise, and rotates the lever body 20 clockwise (S40), and the lever body 20 returns to the D-stage state (S50).

As illustrated in FIGS. 7F and 8, when the driver rotates the lever body 20 forward (clockwise), the gear shift control unit 33 recognizes that the gear shift magnet 32 deviates from the P-stage state (S60), and the rotary motor 30 is operated (S70). Based on the operation of the rotary motor 30, the motor gear 31 is rotated clockwise, and rotates the lever body 20 counterclockwise (S80), and the lever body 20 returns to the P-stage state (S90).

That is, when the driver rotates the lever body 20 further forward than the P-stage state, or when the driver rotates the lever body 20 further rearward than the D-stage state, the lever body 20 may return to the P-stage state or the D-stage state by the rotary motor 30.

Figure 9A:
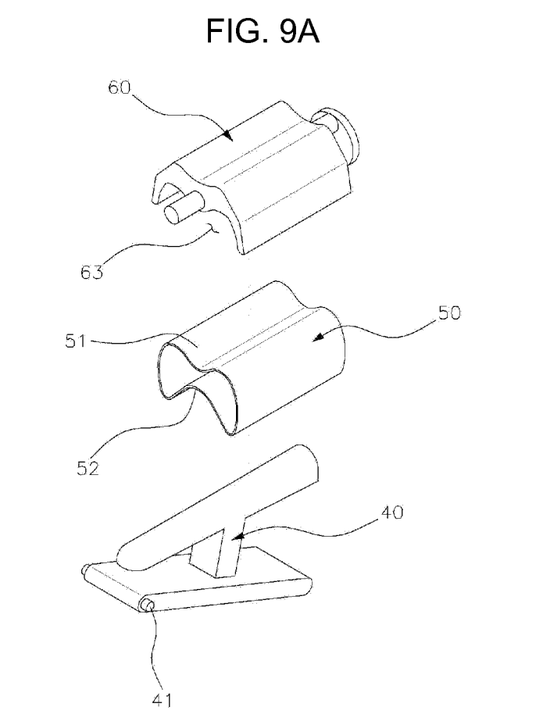
FIG. 9A is an exploded view illustrating an acceleration lever, an elastic unit, and a steering roller according to the exemplary embodiment of the present invention.
Figure 9B:
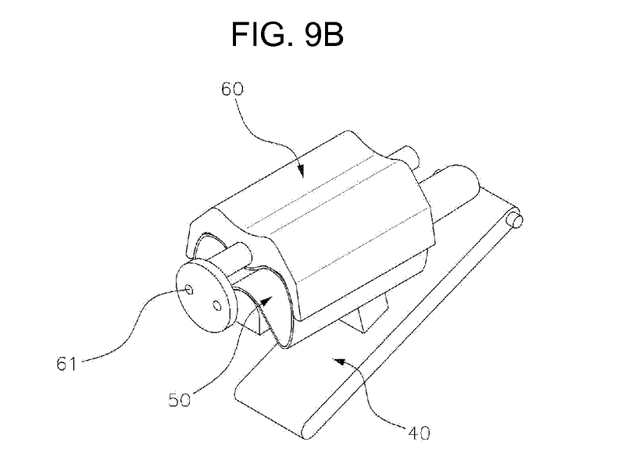
FIG. 9B is a perspective view illustrating an appearance in which the acceleration lever, the elastic unit, and the steering roller according to the exemplary embodiment of the present invention are assembled.
Figure 10:
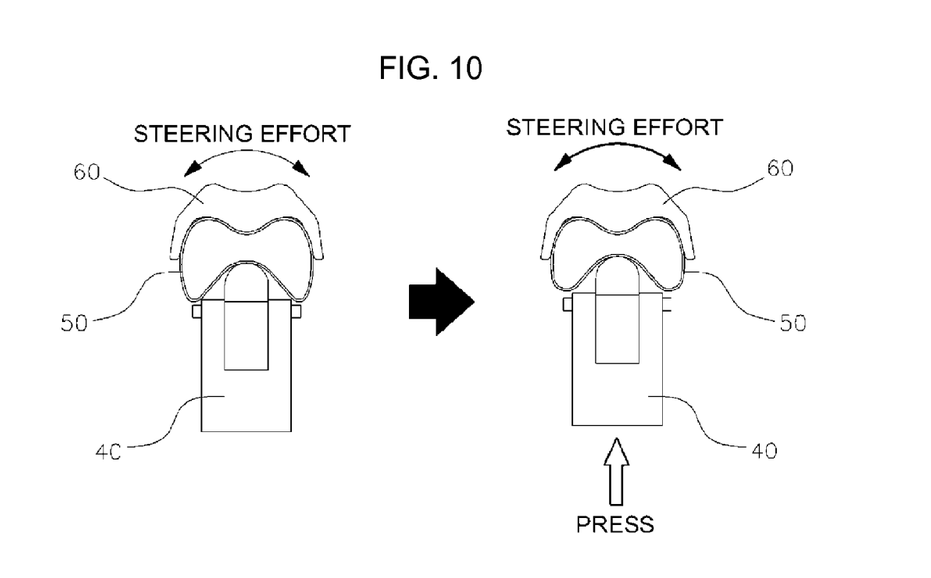
FIG. 10 is a front view illustrating operations of the acceleration lever, the elastic unit, and the steering roller according to the exemplary embodiment of the present invention.

FIG. 9A is an exploded view illustrating the acceleration lever, the elastic unit, and the steering roller according to the exemplary embodiment of the present invention, FIG. 9B is a perspective view illustrating an appearance in which the acceleration lever, the elastic unit, and the steering roller according to the exemplary embodiment of the present invention are assembled, and FIG. 10 is a front view illustrating operations of the acceleration lever, the elastic unit, and the steering roller according to the exemplary embodiment of the present invention.

As illustrated in FIGS. 9A and 9B, the elastic unit 50 may be formed as a flat spring having both depressed surfaces, which has a lower surface that is curved upward so that the acceleration lever 40 may seated on the lower surface, and an upper surface that is curved downward so that the steering roller 60 may be seated on the upper surface.

Specifically, when describing a coupling structure of the elastic unit 50, first, the acceleration lever 40 is rotatably coupled to the lever body 20, a lower depressed surface 52 of the elastic unit 50, which is formed in a shape corresponding to a shape of an upper surface of the acceleration lever 40, is placed on the upper surface of the acceleration lever 40, and a recessed groove 63 of the steering roller 60, which is formed in a shape corresponding to a shape of an upper depressed surface 51 of the elastic unit 50, is placed on the upper depressed surface 51 of the elastic unit 50.

As illustrated in FIG. 10, when the driver holds and presses the acceleration lever 40, the elastic unit 50 between the acceleration lever 40 and the steering roller 60 is compressed, and as a result, a spring constant of the elastic unit 50 is increased, and the steering effort of the steering roller 60 is increased.

On the contrary, when the driver releases the acceleration lever 40, the elastic unit 50 is decompressed, and the spring constant of the elastic unit 50 is decreased, and as a result, the steering effort of the steering roller 60 is decreased.

That is, the steering effort of the steering wheel was changed using an expensive MDPS motor in the related art, but the present invention may simply adjust the steering effort of the steering roller 60 in accordance with a speed of the vehicle using the elastic unit 50 that is formed as a flat spring having both depressed surfaces.

Figure 11:
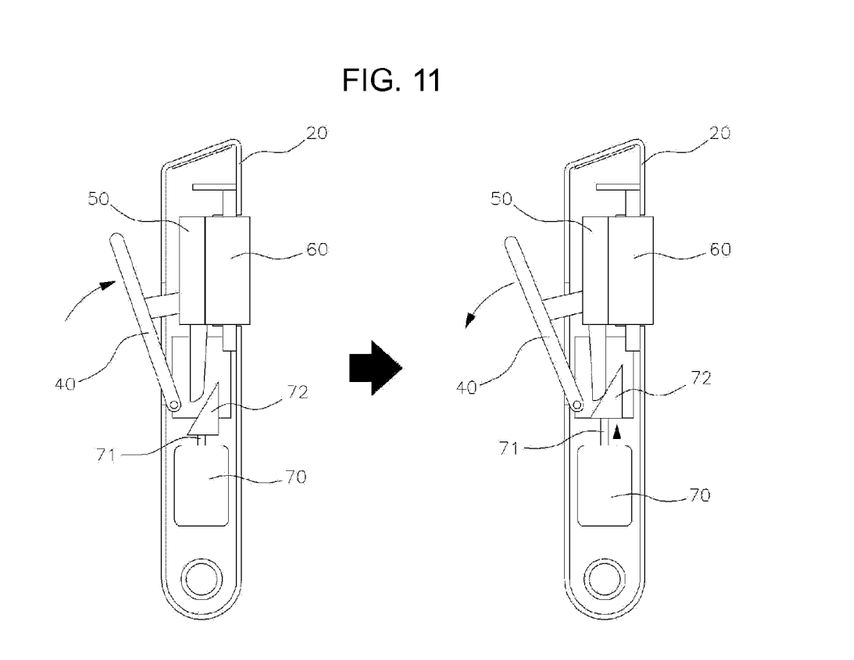
FIG. 11 is a side view illustrating an appearance in the lever body caused by an operation of a rectilinear motor according to the exemplary embodiment of the present invention.
Figure 12:
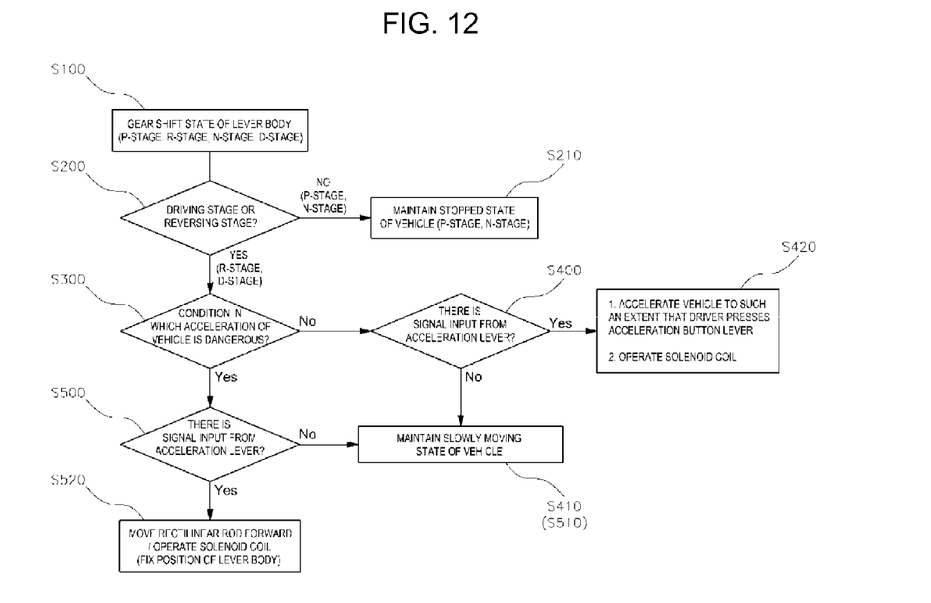
FIG. 12 is a flow chart illustrating logic for controlling operations of the rectilinear motor and the acceleration lever according to the exemplary embodiment of the present invention.

FIG. 11 is a side view illustrating an appearance in the lever body caused by an operation of a rectilinear motor according to the exemplary embodiment of the present invention, and FIG. 12 is a flow chart illustrating logic for controlling operations of the rectilinear motor and the acceleration lever according to the exemplary embodiment of the present invention.

As illustrated in FIG. 11, a rectilinear motor 70, which has a rectilinear rod 71 that is movable forward and rearward, is disposed at a rear side of the acceleration lever 40, thereby restricting motion of the acceleration lever 40.

A restricting member 72, which presses and supports a rear end of the acceleration lever 40 and prevents the acceleration lever 40 from being rotated, is coupled to an end of the rectilinear rod 71, and the restricting member 72 serves to restrict the motion of the acceleration lever 40 in a condition in which acceleration of the vehicle is dangerous.

Specifically, the condition in which acceleration of the vehicle is dangerous means a situation when it is dangerous to rapidly accelerate the vehicle, such as when the vehicle travels on a steeply curved way, when a vehicle collision is imminent, when a failure mode of the vehicle occurs, when the vehicle travels down the slope, and the like.

In this case, the rectilinear motor 70 moves the rectilinear rod 71 forward to return the acceleration lever 40 to an initial state, and prevents the acceleration lever 40 from being further pressed.

As illustrated in FIG. 12, it is first confirmed which is the current gear shift state of the lever body 20 among the P-stage, the R-stage, the N-stage, and the D-stage (S100), and thereafter, whether the gear shift state is a driving stage or a reversing stage (D-stage or R-stage) is confirmed (S200). When the gear shift state is not the driving stage or the reversing stage (the gear shift state is the P-stage or the N-stage), a stopped state of the vehicle is maintained (S210), and when the gear shift state is the driving stage or the reversing stage, whether the current condition is the condition in which acceleration of the vehicle is dangerous is confirmed (S300).

In a case in which acceleration of the vehicle is not dangerous and the vehicle travels ordinarily, the acceleration control unit 42 confirms whether there is signal input from the acceleration lever 40, that is, whether the driver presses the acceleration lever 40 (S400). When the driver presses the acceleration lever 40, the vehicle is accelerated, and in this case, the solenoid coil 37 of the bullet unit 34 is operated to fix the lever body 20 (S420), and when the driver does not press the acceleration lever 40, the vehicle consistently travels slowly (S410).

In the case of the condition in which acceleration of the vehicle is dangerous, the acceleration control unit 42 confirms whether there is a signal input from the acceleration lever 40 (S500). When the driver does not press the acceleration lever 40, the vehicle consistently travels slowly as described above (S510), and when the driver attempts to press the acceleration lever 40, the rectilinear rod 71 is moved forward and hinders the rotation of the acceleration lever 40 (S520).

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lever for a drive-by-wire system, comprising:
   a lever body which is rotatably coupled to a console surface of a vehicle by a console side connecting portion formed at a lower side of the console surface and by a central axis rod;
   a rotary motor which rotates the lever body by rotating a motor gear that is fastened to engage with a central axis gear formed at an end of the central axis rod;
   a gear shift control unit which recognizes a change in position of a gear shift magnet embedded in the motor gear, and changes a gear shift stage of the vehicle;
   an acceleration lever which has a rear end rotatably coupled in the lever body, and protrudes through a first opening hole formed in a side surface of the lever body;
   an acceleration control unit which recognizes a change in position of an acceleration magnet embedded in the acceleration lever, and accelerates the vehicle;
   a steering roller which is mounted in the lever body to be exposed through a second opening hole formed in another side surface of the lever body;
   a steering control unit which recognizes a change in position of a steering magnet attached to an end of the steering roller, and changes a proceeding direction of the vehicle; and
   an elastic unit which is installed between the acceleration lever and the steering roller, and provides elastic restoring force to the acceleration lever and the steering roller,
   wherein a change of a gear shift stage, acceleration, and a change of a proceeding direction of the vehicle are controlled integrally.

2. The lever of claim 1, wherein the elastic unit is formed as a flat spring having both depressed surfaces, which has a lower surface that is curved upward so that the acceleration lever is seated on the lower surface, and an upper surface that is curved downward so that the steering roller is seated on the upper surface, and a shape of the elastic unit is deformed by an operation of the acceleration lever, such that a steering effort of the steering roller is varied.

3. The lever of claim 1, further comprising:
   a central axis groove portion which is coupled to another end of the central axis rod, and has a plurality of curved teeth that curvedly protrudes; and
   a bullet unit which is disposed below the central axis groove portion, has a return spring and a solenoid coil embedded therein, and pushes a bullet rod upward,
   wherein the curved teeth of the central axis groove portion are caught by the bullet rod of the bullet unit, such that shift feeling is generated when the lever body is rotated.

4. The lever of claim 3, wherein when a lever button disposed in the vehicle is operated, the lever body pops up in a stepwise manner by the central axis groove portion and the bullet unit as the rotary motor is rotated, when a stop button disposed in the vehicle is operated, the lever body is temporarily fixed as the rotation of the rotary motor is stopped, and when the stop button is operated, the gear shift control unit recognizes a position of the gear shift magnet embedded in the motor gear as a P-stage.

5. The lever of claim 4, wherein in a state in which the stop button is operated, when the lever body is rotated rearward by a length corresponding to one curved tooth of the central axis groove portion, the gear shift control unit recognizes the changed position of the gear shift magnet as an R-stage, when the lever body is rotated rearward by a length corresponding to two curved teeth of the central axis groove portion, the gear shift control unit recognizes the changed position of the gear shift magnet as an N-stage, and when the lever body is rotated rearward by a length corresponding to three curved teeth of the central axis groove portion, the gear shift control unit recognizes the changed position of the gear shift magnet as a D-stage.

6. The lever of claim 5, wherein when the lever body is rotated rearward by a length corresponding to four or more curved teeth of the central axis groove portion, the rotary motor is operated to return the lever body to the position (D-stage state) at which the lever body is moved rearward by a length corresponding to three curved teeth of the central axis groove portion.

7. The lever of claim 4, wherein in a state in which the stop button is operated, when the lever body is rotated forward, the rotary motor is operated to return the lever body to an initial position (P-stage state) when the stop button is operated.

8. The lever of claim 1, further comprising:
a rectilinear motor which is disposed at a rear side of the acceleration lever, and has a rectilinear rod that is movable forward and rearward,
wherein the rectilinear rod presses and supports a rear end of the acceleration lever when the rectilinear rod is moved forward, and prevents the acceleration lever from being rotated.

* * * * *